(12) United States Patent
Ikonen et al.

(10) Patent No.: US 9,503,150 B2
(45) Date of Patent: Nov. 22, 2016

(54) ANTENNA AND RF FRONT-END ARRANGEMENT

(75) Inventors: Pekka Ikonen, Espoo (FI); Juha Ellae, Halikko (FI)

(73) Assignee: EPCOS AG, Munich (DE)

( * ) Notice: Subject to any disclaimer, the term of this patent is extended or adjusted under 35 U.S.C. 154(b) by 139 days.

(21) Appl. No.: 13/879,396

(22) PCT Filed: Oct. 13, 2010

(86) PCT No.: PCT/EP2010/065332
§ 371 (c)(1),
(2), (4) Date: Jun. 28, 2013

(87) PCT Pub. No.: WO2012/048741
PCT Pub. Date: Apr. 19, 2012

(65) Prior Publication Data
US 2013/0265912 A1 Oct. 10, 2013

(51) Int. Cl.
| | | |
|---|---|---|
| H04B 7/005 | (2006.01) | |
| H04W 4/00 | (2009.01) | |
| H04B 1/38 | (2015.01) | |
| H04B 1/44 | (2006.01) | |
| H01Q 1/24 | (2006.01) | |
| H01Q 1/22 | (2006.01) | |
| H01Q 21/28 | (2006.01) | |
| H04B 7/06 | (2006.01) | |

(Continued)

(52) U.S. Cl.
CPC .............. *H04B 1/44* (2013.01); *H01Q 1/2291* (2013.01); *H01Q 1/243* (2013.01); *H01Q 21/28* (2013.01); *H04B 7/06* (2013.01); *H04B 7/08* (2013.01); *H04W 88/06* (2013.01)

(58) Field of Classification Search
CPC .............. H04B 1/44; H04B 7/08; H04B 7/06; H01Q 21/28; H01Q 1/2291; H01Q 1/243; H04W 88/06
USPC .............................. 370/278; 455/78; 343/702
See application file for complete search history.

(56) References Cited

U.S. PATENT DOCUMENTS

| | | | |
|---|---|---|---|
| 7,342,540 B2 | 3/2008 | Nahar et al. | |
| 2005/0245202 A1* | 11/2005 | Ranta et al. | .................... 455/78 |
| 2008/0106476 A1 | 5/2008 | Tran et al. | |

(Continued)

FOREIGN PATENT DOCUMENTS

| | | |
|---|---|---|
| JP | 2007519334 A | 7/2007 |
| JP | 2008042518 A | 2/2008 |

(Continued)

OTHER PUBLICATIONS

Laird Technologies, "Antennas 2007 Master Catalog," www.lairdtech.com, 2007, 44 pages.

(Continued)

*Primary Examiner* — Kiet Tang
(74) *Attorney, Agent, or Firm* — Slater Matsil, LLP (57) ABSTRACT

An antenna and RF front-end arrangement include at least one LTE or WCDMA Tx&Rx antenna, one MIMO Rx or diversity antenna adapted for low band LTE or WCDMA and one MIMO Rx or diversity antenna adapted for high band LTE or WCDMA. At least one of the MIMO Rx or diversity antennas is adapted for transmitting and receiving WLAN and/or BlueTooth signals. Therefore, a dedicated WLAN antenna is not required and the number of antennas can be reduced.

21 Claims, 4 Drawing Sheets

(51) Int. Cl.
*H04B 7/08* (2006.01)
*H04W 88/06* (2009.01)

(56) References Cited

U.S. PATENT DOCUMENTS

| | | | |
|---|---|---|---|
| 2008/0272964 A1* | 11/2008 | Su et al. | 343/702 |
| 2009/0207082 A1 | 8/2009 | Raghuraman | |
| 2010/0231461 A1* | 9/2010 | Tran | 343/702 |
| 2010/0245265 A1 | 9/2010 | Sato et al. | |
| 2012/0009884 A1* | 1/2012 | Rao | H01Q 1/243 455/73 |
| 2013/0272260 A1* | 10/2013 | Bitran | H04W 16/14 370/329 |

FOREIGN PATENT DOCUMENTS

| | | |
|---|---|---|
| JP | 2010509849 A | 3/2010 |
| WO | WO 2008/055039 A2 | 5/2008 |
| WO | 2010060194 A1 | 6/2010 |
| WO | WO 2010/105272 A1 | 9/2010 |
| WO | WO 2010/105336 A1 | 9/2010 |

OTHER PUBLICATIONS

Pulse, "Combined 4-band GSM and W-CDMA 2100 Antenna," W3530 Datasheet version 1.0, 4-band GSM and W-CDMA 2100, Sep. 2009, 5 pages.
Pulse, "Internal Quad Band PWB Antenna," W3502 Datasheet version 1.1, Internal Quad Band Antenna, Nov. 2008, 4 pages.
Pulse, "Internal Quad Band PWB Antenna," W3501 Datasheet version 1.0 Internal Quad Band Antenna, Apr. 2008, 8 pages.
Molex, "105263 Cellular 6-band Standalone Antenna," Jun. 2012, 5 pages.

* cited by examiner

ANTENNA AND RF FRONT-END ARRANGEMENT

This patent application is a national phase filing under section 371 of PCT/EP2010/065332, filed Oct. 13, 2010, which application is hereby incorporated herein by reference in its entirety.

TECHNICAL FIELD

The invention concerns an antenna and radio frequency (RF) front-end arrangement comprising antennas dedicated for long-term evolution (LTE) or wideband code division multiple access (WCDMA).

BACKGROUND

New system protocols like LTE require additional antennas in mobile phones. In order to perform adequately, every antenna in a mobile phone requires a dedicated volume which is sufficiently free from other components. In addition to this, the more antennas a mobile phone occupies, the more difficult it will be to ensure the interoperability of these antennas. Therefore, there is a need to reduce the number of antennas in a mobile phone.

Apart from the cellular antennas, a mobile phone typically comprises a variety of antennas including antennas dedicated for a wireless local area network (WLAN) and/or BlueTooth. Typically, mobile phones have separate cellular antennas and a WLAN/BlueTooth antenna. Cellular antennas are typically variants of inverted F-antennas or inverted L-antennas, implemented on normal plastic carriers using either flex-film assembly or laser-direct structuring. Alternatively, the antennas can be directly implemented into the phone mechanics, e.g., with flex-film assembly. Typical WLAN/BlueTooth antennas are implemented either as ceramic chip antennas or similarly as above-described cellular antennas. WLAN/BlueTooth antennas can also be implemented on the same plastic carrier as cellular antennas. A common challenge experienced in this implementation is the isolation between cellular and WLAN/BlueTooth antennas, where a typical target can be 10 dB of isolation between the antennas. From a co-existence point of view, LTE band 7 is most problematic because of the close proximity of band 7 TX and RX frequencies to WLAN frequencies. Here, it is challenging to provide sufficient isolation between the antennas. Filtering is also difficult due to limited selectivity of filters.

SUMMARY OF THE INVENTION

In one aspect, this invention provides an antenna and RF front-end arrangement with a reduced number of antennas in a mobile phone.

An antenna arrangement according to the present invention comprises antennas dedicated for LTE or WCDMA in such a way that there is one MIMO (Multiple input and multiple output) Rx or diversity antenna operating at low band and one MIMO Rx or diversity antenna operating at high band. One of the MIMO Rx or diversity antennas is adapted for transmitting and receiving WLAN and/or BlueTooth signals.

LTE always requires a main antenna that is used for the Tx and Rx signals. This main antenna is referred to as Tx&Rx antenna in the following. LTE further requires a separate Rx antenna for the MIMO Rx path. The Tx&Rx antenna and the Rx antenna are on the same frequency band. The use of a separate MIMO Rx antenna boosts the data rates.

WCDMA does not require or support MIMO, but it has Rx diversity as an option. In diversity, there is a main Tx&Rx antenna and a separate Rx diversity antenna. Both Tx&Rx and the Rx diversity antennas receive the same signal. This does not boost data rates like in LTE, but it provides better reception in weak fields.

In case of several bands it may be beneficial to use several radiators, either for the Tx&Rx and/or the MIMO antenna. According to the present invention, the MIMO antenna function is implemented with two radiators, one for the low bands and another for the high bands. The front-end arrangement is designed in such a way that also WLAN can be supported without additional radiators.

From antenna and RF front-end perspective, the proposed invention also supports WCDMA Rx diversity on any of the bands where LTE is supported without any modification needed to these parts. The corresponding front-end arrangement enables the use of the Rx diversity antenna for WLAN without additional radiators.

The antenna arrangement can either comprise a single Tx&Rx antenna or two Tx&Rx antennas, one dedicated for low band LTE or WCDMA and the other one dedicated for high band LTE or WCDMA.

Accordingly, the invention enables the removal of a dedicated WLAN and/or BlueTooth antenna by utilizing one of the MIMO Rx or diversity antennas in a mobile phone for this function. Therefore, the invention reduces the number of antennas in mobile phones, thereby releasing volume that has hitherto been required for the additional antenna and saving this volume for other components and allowing more freedom in industrial design.

In an embodiment of the present invention, the antenna arrangement comprises two antennas adapted for a low band and two antennas adapted for high band. The frequencies of low band range approximately from 700 to 960 MHz. This could include, but is not limited to, frequency bands 5, 8, 17, and 20. The frequency range of high band can range approximately from 1700 up to 2700 MHz. This could include, e.g., bands 1, 2, 4, and 7.

Alternatively, a single Tx&Rx antenna can be adapted for both low and high bands.

The present invention concerns two usage scenarios of the antenna arrangement. According to the first scenario, one MIMO Rx or diversity antenna is dedicated to be used for sending and receiving WLAN and/or BlueTooth signals simultaneously to the LTE or WCDMA reception. For this purpose, preferably, the high band MIMO Rx or diversity antenna is used as the cellular high band frequencies are closer to the WLAN/BlueTooth frequencies so that the antenna matching is easier compared to the matching of a low band antenna.

When the high band is used for LTE or WCDMA, the high band MIMO Rx or diversity antenna can be used simultaneously for LTE or WCDMA and WLAN/BlueTooth. Respectively, if low band is used for LTE or WCDMA, this high band MIMO Rx or diversity antenna is used for WLAN/BlueTooth and the low band antennas are used for LTE or WCDMA.

In particular, in case high band is used for LTE or WCDMA, the high band MIMO Rx or diversity antenna is used simultaneously for the LTE or WCDMA receive channels and WLAN/BlueTooth. In this case, the high band Tx&Rx antenna is used for the LTE or WCDMA transmit and receive channels. Further, the antenna arrangement comprises means for switching between the LTE or WCDMA high band receive channels.

This configuration can be considered as a reconfigurable WLAN/cellular duplexer. One MIMO Rx or diversity antenna is connected to two paths at the same time. The first path comprises the WLAN/BlueTooth Tx and Rx paths and the second path comprises different sub-paths in relation to the different cellular Rx paths and a switch which can connect the antenna to one of these sub-paths.

A specific case of the above idea is a situation where only the functionalities of one single cellular Rx band and WLAN/BlueTooth are combined into one antenna. A simplified front-end configuration results in this case, as means for switching between various receive channels are not necessary. When high band is used for LTE or WCDMA, the high band MIMO Rx or diversity antenna is used simultaneously for one LTE or WCDMA receive channel and WLAN/BlueTooth. The high band Tx&Rx antenna is used for the other cellular transmit and receive channels.

Respectively, in case low band is used for LTE or WCDMA, the high band MIMO Rx or diversity antenna can be used for WLAN/BlueTooth. The low band antennas are used for LTE or WCDMA Rx and Tx channels.

The second usage scenario of the present invention is one where the WLAN/BlueTooth path can be switched to either the high band or the low band MIMO Rx or diversity antenna and where the low band antenna is characterized in that it can also be matched at the WLAN/BlueTooth frequency.

When LTE or WCDMA is active at low band, the high band MIMO Rx or diversity antenna is used for WLAN and/or BlueTooth. Respectively, if, at a given time, LTE or WCDMA is active at high band, the low band MIMO Rx or diversity antenna is used for WLAN/BlueTooth.

Each antenna comprises a radiator. This radiator can be a metal plate in a rectangular shape. Alternatively, the metal plate can comprise slots or can be structured in any other form. Alternatively, in principle, the radiator can be any conductive part in the phone mechanics. The radiators can also be implemented in the phone mechanics and they can be connected to a printed wiring board (PWB) by a feeding tab or by a feeding tab and a grounding tab. Preferably, the radiators are placed near the corners of the PWB.

The two antennas dedicated for cellular low band can be located near one end of the PWB. The other antenna pair for cellular high band can be located near the other end of the PWB. This configuration provides a good isolation between the high band antennas and the low band antennas. The antennas can be any variant of inverted F-antennas, inverted L-antennas, or any other antenna used in mobile phones.

Each antenna arrangement further comprises matching circuits which match the antennas over the high or low band frequency ranges. Since high band and low band antenna pairs are at the opposite ends of the PWB, isolation between these antennas is good when the pairs are matched over the high band and low band frequency ranges, respectively.

Impedance of the low band antennas is such that it can be tuned with an impedance tuning circuit over the entire low band frequency range with adequate isolation between the radiators.

The low band MIMO Rx or diversity antenna is designed in such a way that its impedance can also be matched to 50 Ohms over the high band. Therefore, the impedance of the low band MIMO Rx or diversity antenna is also such that it can be matched over the WLAN band with moderate complexity and adequate performance. Since the high band and low band antenna pairs are located near opposite ends of the PWB, isolation between the low band and high band antennas is ensured also in case when the low band MIMO Rx or diversity antenna is used as WLAN/BlueTooth antenna and matched over the WLAN band. In this case, LTE or WCDMA is active at the high band.

DETAILED DESCRIPTION OF ILLUSTRATIVE EMBODIMENTS

Figure 1:
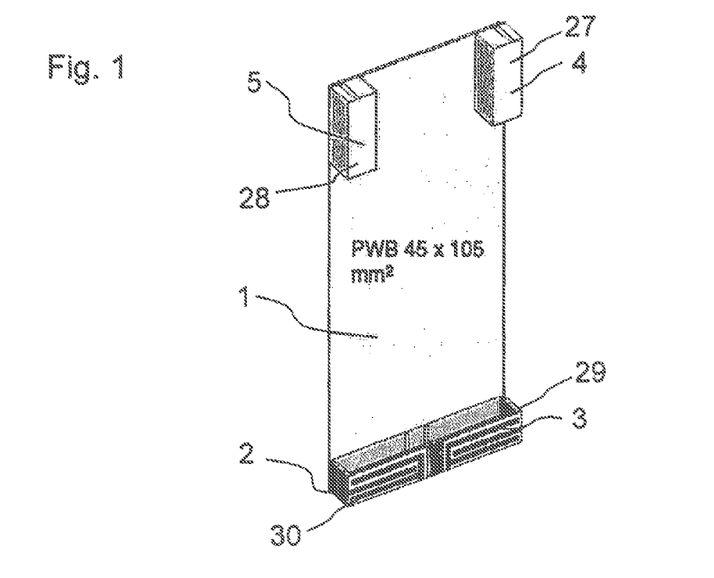
FIG. 1 shows an antenna configuration according to the present invention.

FIG. 1 shows a printed wiring board (PWB) 1 comprising four antennas 2, 3, 4, 5. The antennas 2-5 are placed next to a corner of the PWB 1 each. Two antennas 2, 3 are placed near the corners at the bottom side of the figure. These antennas 2, 3 form an antenna pair dedicated for cellular low band. The frequency band of the low band ranges from approximately 700 to 960 MHz. The other antenna pair 4, 5 is depicted near the upper corners of the PWB 1. This antenna pair 4, 5 is dedicated for the cellular high band, approximately 1700 up to 2700 MHz. Antennas 2-5 can be any variant of inverted F-antennas, inverted L-antennas, or any other antenna used in mobile phones.

Each antenna 2-5 comprises a radiator 27, 28, 29, 30. According to the embodiment of FIG. 1, the radiators 27, 28 of the high band antennas 4, 5 are metal plates in a rectangular shape. Moreover, the radiators 29, 30 of the low band antennas 2, 3 are metal plates comprising slots. Alternatively, the metal plates can also be structured in any other form. The radiators 27-30 are placed near the corners of the PWB 1.

Underneath each radiator 27-30, there is a ground plane in the PWB 1. Each radiator 27-30 is connected to the PWB 1 via a feeding tab. The feeding tab provides a signal to the radiator 27-30.

Figure 2:
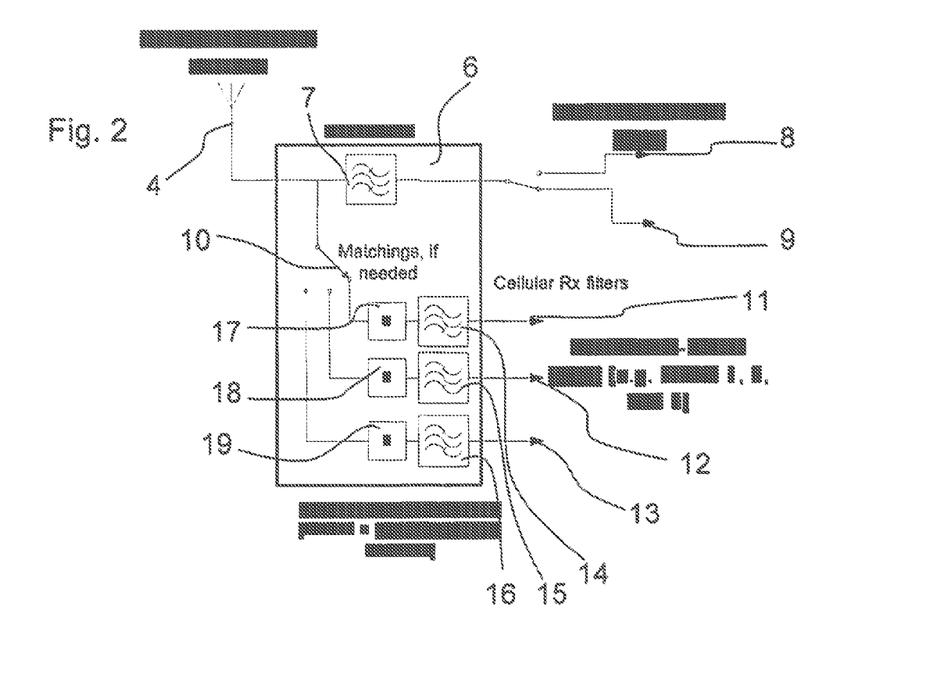
FIG. 2 shows a RF front-end configuration according to a first embodiment of the present invention.

FIG. 2 shows a block diagram of a first embodiment of the present invention. In particular, a RF front-end configuration according to the first embodiment is shown in FIG. 2. This RF front-end configuration is connected to the high band MIMO Rx or diversity antenna 4. The front-end 6 enables simultaneous use of the antenna 4 for LTE or WCDMA high band Rx channels and WLAN/BlueTooth.

The front-end circuit can be considered as a reconfigurable duplexer. It connects the antenna 4 to two different paths at the same time. The first path comprises the WLAN/BlueTooth Rx path 8 and WLAN/BlueTooth Tx path 9. This first path comprises a band pass filter 7 which is transparent for the WLAN/BlueTooth frequencies and filters out other frequencies. The second path comprises one of three different sub-paths. By means of a switch 10 one of the three different sub-paths can be connected to the antenna 4. Each sub-path is connected to a different LTE or WCDMA high band Rx path 11, 12, 13 relating to different bands. Accordingly, the switch 10 connects the antenna 4 with one of the LTE or WCDMA high band Rx paths 11-13. Each sub-path further comprises a band pass filter 14, 15, 16 for the corresponding frequencies and means 17, 18, 19 for matching between the antenna 4 and the corresponding LTE or WCDMA high band Rx path 11, 12, 13.

The high band MIMO Rx or diversity antenna 4 is matched so that it covers at least one of the high band LTE or WCDMA Rx bands and the WLAN band.

The high band LTE or WCDMA Tx&Rx antenna 5 is not shown in FIG. 2. This antenna 5 is used for the cellular high band Tx and Rx paths.

Furthermore, at a time the low band is used for LTE or WCDMA the high band MIMO Rx or diversity antenna 4 is used for receiving and sending WLAN/BlueTooth signals. Both low band antennas 2, 3 are used for LTE or WCDMA.

Figure 3:
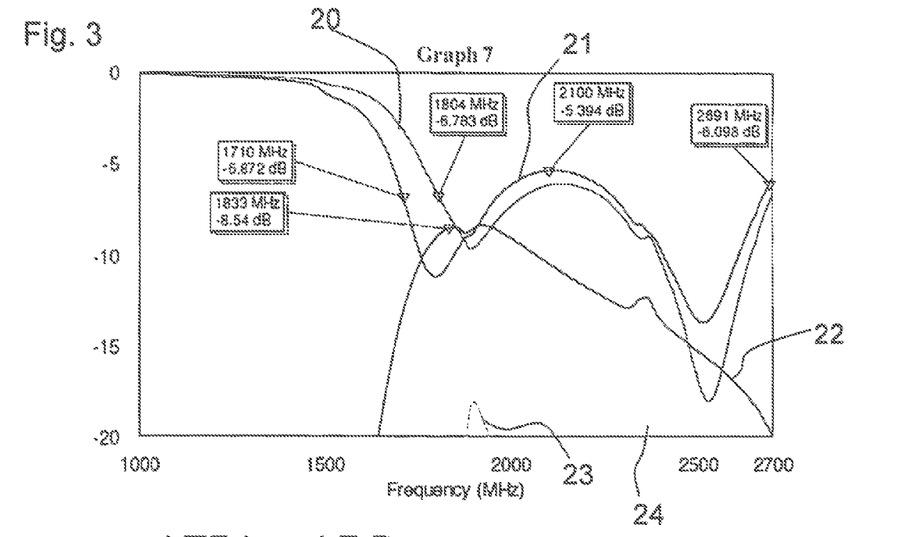
FIG. 3 shows the frequency characteristics of the antenna configuration according to the first embodiment.

FIG. 3 shows the frequency characteristics of the high band antennas 4 which are matched passively over the entire high band. The first two curves 20, 21 show the reflection coefficients for the two high band antennas 4, 5. The third curve 22 shows the isolation between the two antennas 4, 5. Moreover, isolation between low band and high band antennas is shown in curves 23, 24.

The isolation between the two high band antennas 4, 5 is better than 10 dB over most of the frequency range.

Losses introduced when implementing the antennas inside a real mobile phone would improve the worst case isolation close to 10 dB inside. This relatively high isolation is achieved by the fact that the antennas 4, 5 are located next to the corners and also by the use of specifically designed matching circuits. Isolation between the high band and the low band Tx&Rx antennas is better than 15 dB.

The antennas are also matched over the WLAN band and isolation between the two high band antennas 4, 5 is over the WLAN band around 13 dB. Since the MIMO Rx or diversity antenna 4 is matched over the cellular high band Rx bands and simultaneously over the WLAN band, and since the isolation between the two high band antennas 4, 5 is good over all of these bands, the front-end configuration shown in FIG. 2 can be used to enable simultaneous use of high band MIMO Rx or diversity antenna 4 for LTE or WCDMA high band Rx and WLAN/BlueTooth.

Figure 4:
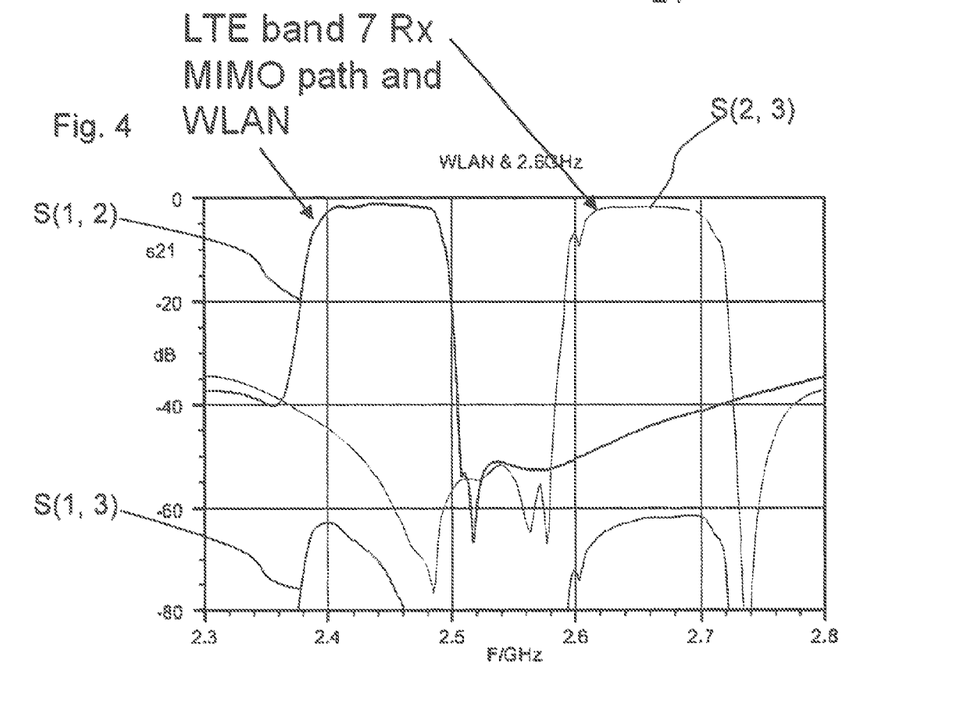
FIG. 4 shows the frequency characteristics of a WLAN and cellular band 7 RX filter switched to operate like a duplexer.

FIG. 4 shows the frequency characteristics of the WLAN/cellular duplexer according to FIG. 2. The first curve shows the matrix element S(2,3). This corresponds to the transmission of the antenna 4 for the LTE band 7 Rx. The second curve shows the matrix element S(1,2). This corresponds to the transmission of the antenna 4 for the frequency of WLAN. Moreover, the isolation is shown in curve S(1,3).

Figure 5:
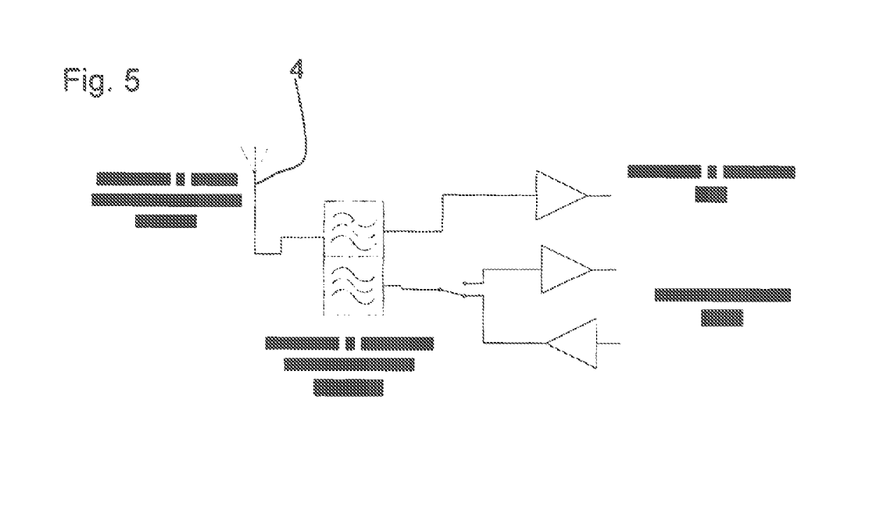
FIG. 5 shows a simplified example case of a front-end configuration according to a first embodiment of the present invention.

FIG. 5 shows a block diagram of a simplified example of the first embodiment of the present invention. Here, the functionality of band 7 Rx and WLAN/BlueTooth is combined into high band MIMO Rx or diversity antenna 4. The other high band antenna 5, which is not shown in FIG. 5, is used for Tx&Rx over the respective band. As can be seen from FIG. 5, the front-end configuration simplifies with respect to FIG. 2. The switch 10 of FIG. 2 which connects the antenna 4 to different LTE or WCDMA Rx paths is not needed anymore in the embodiment of FIG. 5.

Correspondingly, if low band is used for LTE, high band MIMO Rx or diversity antenna 4 is used for sending and receiving WLAN/BlueTooth signals. Low band antennas 2, 3 are for low band LTE or WCDMA Tx and Rx paths.

According to a second embodiment of the present invention, the unused MIMO Rx or diversity antenna can be used for WLAN/BlueTooth. If the high band is used for LTE, low band MIMO Rx or diversity antenna 2, 3 can be used for WLAN/BlueTooth. Respectively, if low band is used for LTE, high band MIMO Rx or diversity antenna 4, 5 can be used for WLAN/BlueTooth.

Figure 6:
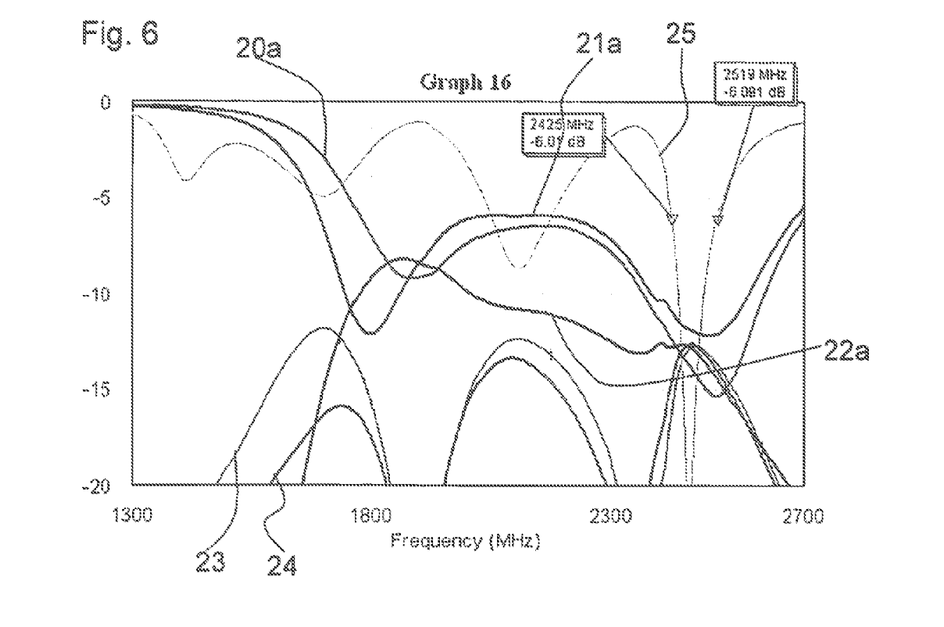
FIG. 6 shows the frequency characteristics of the antenna configuration according to a second embodiment.

FIG. 6 shows an exemplary matching response for an embodiment where the high band antennas 4, 5 are used for LTE. Thus, they are passively matched over the entire high band. Moreover, the low band MIMO Rx or diversity antenna 2, 3 is matched over the WLAN/BlueTooth frequency with a modification in the matching circuit. In practice, the reconfigurability of the matching circuit can be handled in several ways, e.g., by switching. The first two curves 20*a*, 21*a* show the reflection coefficients for the high band antennas 4, 5. The third curve 25 shows the reflection coefficient for the low band MIMO Rx or diversity antenna 2 which is matched over the WLAN band. The reflection coefficient for this antenna 2 is minimal over the WLAN/BlueTooth frequencies. Further, the isolation 23*a*, 24*a* between the low band and the high band antennas is shown. Moreover, the isolation between the two high band antennas is shown in curve 22*a*.

Figure 7:
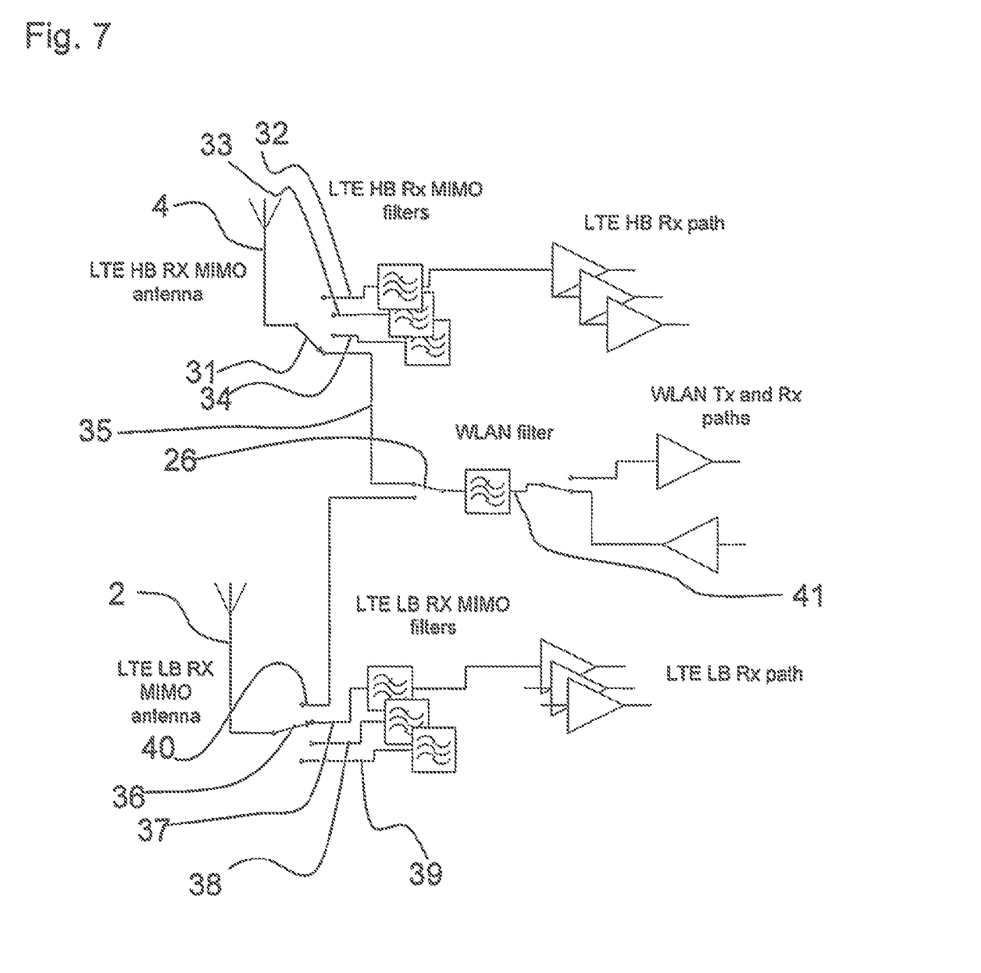
FIG. 7 shows a front-end configuration according to the second embodiment of the present invention.

FIG. 7 shows a block diagram of a front-end configuration according to the second embodiment of the present invention. The high band MIMO Rx or diversity antenna 4 is connected to a switch 31. This switch 31 selects one out of four paths 32, 33, 34, 35. The first three paths 32, 33, 34 are LTE or WCDMA high band Rx paths each corresponding to one LTE or WCDMA high band. Each of the first three paths 32, 33, 34 comprises filtering and matching means for the corresponding band. The fourth path 35 comprises switching means 26.

Correspondingly, the low band MIMO Rx or diversity antenna 2 is also connected to a switch 36. This switch 36 selects one out of four paths 37, 38, 39, 40, wherein three paths 37, 38, 39 are LTE or WCDMA low band Rx paths comprising filtering and matching means for the corresponding band. The fourth path 40 can connect the low band MIMO Rx or diversity antenna 2 to the switching means 26.

The switching means 26 are connected to a WLAN/BlueTooth path 41. The switching means 26 can connect the WLAN/BlueTooth path 41 either to the switch 31 via the fourth path 35 or to the switch 36 via the fourth path 40.

In the setting, as shown in FIG. 7, the WLAN/BlueTooth path 41 is connected to the high band MIMO Rx or diversity antenna 4 via switch 26, fourth path 35, and switch 31. At the same time, the low band MIMO Rx or diversity antenna 2 is connected via switch 36 to the second path 37 and the corresponding low band LTE or WCDMA Rx path.

The switch 26 can connect the WLAN/BlueTooth path 41 either to switch 31 which is connected to the high band MIMO Rx or diversity antenna 4 or to the switch 36 which is connected to the low band MIMO Rx or diversity antenna 2. According to the second embodiment, the WLAN/BlueTooth path 41 is always linked to the one of the two MIMO Rx or diversity antennas 2, 4 that is not used for LTE or WCDMA.

The present invention is not limited to a specific number of LTE or WCDMA low band and high band Rx paths. This number can vary between different phone models. It is possible, for example, to have one less LTE or WCDMA low band Rx path and one additional LTE or WCDMA high band Rx path compared to the embodiment as shown in FIG. 7. In general, any combination or number of cellular RF paths with at least one LTE or WCDMA high band Rx path and at least one LTE or WCDMA low band Rx path is covered by the present invention.

The present invention enables the removal of an antenna that is solely dedicated to WLAN/BlueTooth by utilizing one of the two MIMO Rx or diversity antennas 2-5 in the phone for this function. The antenna arrangement ensures good performance and isolation between the antennas and interoperability of WLAN/BlueTooth with cellular bands. The invention also saves the volume of dedicated WLAN/BlueTooth antennas for other components in the phone.

The invention claimed is:

1. An antenna arrangement comprising:
    long term evolution (LTE) Tx&Rx antenna;
    a low band antenna unit comprising a first Rx antenna which is configured for operating as a multiple input and multiple output (MIMO) Rx antenna for LTE signals in a low band;
    a high band antenna unit comprising a second Rx antenna which is configured to operate as a MIMO Rx antenna for LTE signals in a high band;
    a plurality of LTE high band Rx paths;
    a plurality of LTE low band Rx paths;
    at least one of a WLAN path or a Bluetooth path;
    a switch;
    a first switching component connected to the second Rx antenna of the high band antenna unit to enable connection of the second Rx antenna of the high band antenna unit to one of plurality of the LTE high band Rx paths to the switch; and
    a second switching component connected to the first Rx antenna of the low band antenna unit to enable connection of the first Rx antenna of the low band antenna unit to one of the plurality of LTE low band Rx paths to the switch;
    wherein at least one of the first Rx antenna or the second Rx antenna is configured for transmitting and receiving at least one of WLAN or Bluetooth signals; and
    wherein the switch is configured to connect the at least one of the WLAN path or the Bluetooth path to one of the first Rx antenna or the second Rx antenna via the first and second switching components.

2. The antenna arrangement according to claim 1, wherein the low band antenna unit comprises one LTE or wideband code division multiple access (WCDMA) Tx&Rx antenna and one MIMO Rx or diversity antenna and wherein the high band antenna unit comprises one Tx&Rx antenna and one MIMO Rx or diversity antenna configured for high band.

3. The antenna arrangement according to claim 1, wherein:
    the low band and high band antenna unit each comprise a common LTE or WCDMA Tx&Rx antenna configured for both low and high bands.

4. The antenna arrangement according to claim 1, wherein the antenna arrangement is configured to simultaneously use the second Rx antenna of the high band antenna unit for LTE in the high band and for at least one of WLAN or Bluetooth.

5. The antenna arrangement according to claim 1, further comprising a Tx&Rx antenna, wherein the antenna arrangement is configured to, at a given time, use the Tx&Rx antenna and the second Rx antenna of the low band antenna unit for LTE or WCDMA and to simultaneously enable the MIMO Rx or diversity antenna of the high band antenna unit to be used for at least one of WLAN or Bluetooth.

6. The antenna arrangement according to claim 1, wherein the first switching component configured to connect the second Rx antenna of the high band antenna unit to a selected one of the plurality of LTE high band receive paths, wherein the second Rx antenna of the high band antenna unit is simultaneously connected to the at least one of the WLAN path or the Bluetooth path to form a duplexing function of the at least one of the WLAN path or the Bluetooth path and the selected one of the plurality of LTE high band receive paths.

7. The antenna arrangement according to claim 6, wherein each of the plurality of LTE high band receive paths comprises:
    a filter configured to filter a corresponding WCDMA or LTE frequency band; and
    a matching component.

8. The antenna arrangement according to claim 7, wherein the at least one of the WLAN path or the Bluetooth path comprises a filtering component configured to filter at least one of WLAN frequencies or Bluetooth frequencies.

9. The antenna arrangement according to claim 1, further comprising a Tx&Rx antenna, wherein the antenna arrangement is configured, at a given time, to use the Tx&Rx antenna and the second Rx antenna of the high band antenna unit for LTE, and to simultaneously enable the first Rx antenna of the low band antenna unit to be used for at least one of WLAN or Bluetooth.

10. The antenna arrangement according to claim 1, wherein each path of the plurality of LTE high band Rx paths and the plurality of LTE low band Rx paths comprise a filtering component and a matching component to a corresponding frequency band.

11. The antenna arrangement according to claim 1, further comprising a TX&Rx antenna, wherein the antenna arrangement is configured to use, at a given time, the Tx&Rx antenna and the first Rx antenna of the low band antenna unit for LTE or WCDMA and to simultaneously enable the second Rx antenna of the high band antenna unit to be used for at least one of WLAN or Bluetooth.

12. The antenna arrangement according to claim 11, wherein each of the plurality of LTE high band Rx paths and the plurality of LTE low band Rx paths comprise a filtering component and a matching component to a corresponding frequency band.

13. The antenna arrangement according to claim 1, wherein each of the antennas are mounted on a printed wiring board and located near corners of the printed wiring board.

14. The antenna arrangement according to claim 1, wherein each antenna comprises a radiator.

15. The antenna arrangement according to claim 14, wherein each radiator comprises a conductive part in phone mechanics located close to corners of a phone.

16. The antenna arrangement according to claim 14, wherein each antenna comprises a radiator positioned above a printed wiring board and connected to the printed wiring board by a feeding tab or by a feeding tab and a grounding tab.

17. The antenna arrangement according to claim 14, wherein each antenna comprises a radiator implemented in phone mechanics and connected to a printed wiring board by a feeding tab or by a feeding tab and a grounding tab.

18. The antenna arrangement according to claim 14, wherein the antenna arrangement comprises a matching component configured to match the radiators to a corresponding LTE or WCDMA band.

19. An antenna arrangement comprising:
long term evolution (LTE) Tx&Rx antenna;
a low band antenna unit comprising a first Rx antenna which is configured to operating as a multiple input and multiple output (MIMO) Rx antenna for LTE signals in a low band;
a high band antenna unit comprising a second Rx antenna which is configured to operate as a MIMO Rx antenna for LTE signals in a high band;
a plurality of LTE high band Rx paths;
a plurality of LTE low band Rx paths;
at least one of a WLAN path or a Bluetooth path;
a switch;
a first switching component connected to the second Rx antenna of the high band antenna unit to enable connection of the second Rx antenna of the high band antenna unit to one of plurality of the LTE high band Rx paths to the switch; and
a second switching component connected to the first Rx antenna of the low band antenna unit to enable connection of the first Rx antenna of the low band antenna unit to one of the plurality of LTE low band Rx paths to the switch;
wherein the second Rx antenna is configured for using LTE in the high band simultaneously with at least one of WLAN or Bluetooth signals; and
wherein the switch is configured to connect the at least one of the WLAN path or the Bluetooth path to one of the first Rx antenna or the second Rx antenna via the first and second switching components.

20. An antenna arrangement comprising:
Wideband Code Division Multiple Access (WCDMA) Tx&Rx antenna;
a low band antenna unit comprising a first Rx antenna which is configured for operating as a diversity Rx for WCDMA signals in a low band and which is configured for receiving the same signal as the Tx&Rx antenna;
a high band antenna unit comprising a second Rx antenna which is configured to operate as a diversity Rx antenna for WCDMA signals in a high band and which is configured for receiving the same signal as the Tx&Rx antenna;
a plurality of WCDMA high band Rx paths;
a plurality of WCDMA low band Rx paths;
at least one of a WLAN path or a Bluetooth path;
a switch;
a first switching component connected to the second Rx antenna of the high band antenna unit to enable connection of the second Rx antenna of the high band antenna unit to one of plurality of the WCDMA high band Rx paths or to the switch; and
a second switching component connected to the first Rx antenna of the low band antenna unit to enable connection of the first Rx antenna of the low band antenna unit to one of the plurality of WCDMA low band Rx paths or to the switch;
wherein at least one of the first Rx antenna or the second Rx antenna is configured for transmitting and receiving at least one of WLAN or Bluetooth signals; and
wherein the switch is configured to connect the at least one of the WLAN path or the Bluetooth path to one of the first Rx antenna or the second Rx antenna via the first and second switching components.

21. An antenna arrangement comprising:
Wideband Code Division Multiple Access (WCDMA) Tx&Rx antenna;
a low band antenna unit comprising a first Rx antenna which is configured for operating as a diversity Rx for WCDMA signals in a low band and which is configured for receiving the same signal as the Tx&Rx antenna;
a high band antenna unit comprising a second Rx antenna which is configured to operate as a diversity Rx antenna for WCDMA signals in a high band and which is configured for receiving the same signal as the Tx&Rx antenna;
a plurality of WCDMA high band Rx paths;
a plurality of WCDMA low band Rx paths;
at least one of a WLAN path or a Bluetooth path;
a switch;
a first switching component connected to the second Rx antenna of the high band antenna unit to enable connection of the second Rx antenna of the high band antenna unit to one of plurality of the WCDMA high band Rx paths or to the switch; and
a second switching component connected to the first Rx antenna of the low band antenna unit to enable connection of the first Rx antenna of the low band antenna unit to one of the plurality of WCDMA low band Rx paths or to the switch;
wherein the second Rx antenna is configured for using WCDMA in the high band simultaneously with at least one of WLAN or Bluetooth signals; and
wherein the switch is configured to connect the at least one of the WLAN path or the Bluetooth path to one of the first Rx antenna or the second Rx antenna via the first and second switching components.

* * * * *